United States Patent
Caretta

[11] 3,972,978
[45] Aug. 3, 1976

[54] PROCESS FOR AUTOMATICALLY DISCHARGING A TIRE FROM THE CURING MOLD

[75] Inventor: Renato Caretta, Cedrate di Gallarate (Varese), Italy

[73] Assignee: Industrie Pirelli S.p.A., Milan, Italy

[22] Filed: Dec. 16, 1974

[21] Appl. No.: 533,218

Related U.S. Application Data

[62] Division of Ser. No. 307,953, Nov. 20, 1972, abandoned.

[30] Foreign Application Priority Data
Nov. 26, 1971  Italy.................................. 31638/71

[52] U.S. Cl................................ 264/334; 264/315; 425/38
[51] Int. Cl.$^2$........................ B29C 7/00; B29H 5/02
[58] Field of Search............ 264/315, 326, 334–336; 425/38, 46

[56] References Cited
UNITED STATES PATENTS
2,778,060  1/1957  Brundage.......................... 425/38 X
3,550,196  12/1970  Gazuit.............................. 425/38 X

*Primary Examiner*—Jan H. Silbaugh
*Attorney, Agent, or Firm*—Stevens, Davis, Miller & Mosher

[57] ABSTRACT

A method for discharging a cured tire from a mold in which method the lower sidewall of the tire is disengaged from the lower section of the mold by raising the tire with respect to the position in which it had been cured while maintaining the sections of the mold at its tread and upper sidewall in contact with the tire, then disengaging the section at its tread by moving said section radially outwardly while simultaneously pushing the tire and section at its upper sidewall downward to a level lower than that corresponding to the lower surface of the section of the mold for the tire's tread, displacing the section for the tire tread inwardly until its diameter is less than the outer diameter of the tire and finally raising the tire and the upper section for the upper sidewall until the tire is disengaged from the upper sidewall section. The molding apparatus is constituted by at least one upper and one lower mold section for the sidewall of the tire and an intermediate section for the tread, pistons and ledger for moving the upper and intermediate sections with respect to the lower section, together or independently, lateral guides to displace the intermediate section in a radially inward or outward direction, a membrane for insertion in the tire, a screw with opposing threads having nuts thereon to which are attached the ends of the membrane and permit the membrane to move into and out of contact with the interior of the tire and a conduit in communication with the interior of the tire to permit entry and exit of compressible fluid.

2 Claims, 8 Drawing Figures

PROCESS FOR AUTOMATICALLY DISCHARGING A TIRE FROM THE CURING MOLD

This is a division, of application Ser. No. 307,953, filed Nov. 20, 1972, now abandoned.

The present invention relates to a process for automatically discharging a tire, after its curing, from a mold comprising at least two sections corresponding to the tire sidewalls and a section formed by sectors, radially displaceable in both directions, corresponding to the tread band of the tire.

In the already known curing units provided with a mold comprising, besides the sections corresponding to the sidewalls of the tire to be cured, at least one section formed by sectors, corresponding to the tread band, the tire, after the complete opening of the mold, remains leaning on the lower section of the latter. In some of these curing units, the sectors of the mold remain always on the same plane on which they lie at the time of the curing operation. In other curing units, they are lifted together with the lower section, remaining however at the same level of the latter. In still other curing units, they are lifted together with the upper section of the mold in order to facilitate the discharge of the cured tire, which in this way can be clasped from the outside.

U.S. Pat. No. 3,337,918 describes a curing unit provided with an appropriate device, which is arranged coaxially to the mold and which raises the cured tire from the lower section of the mold by pushing upward the beads of the tire, with which the peripheral band of the mold is engaged.

In the above indicated cases, the tire is removed from the curing unit by hand or by means of suitable devices comprising collapsible sectors, which clasp the tire from the inside or from the outside and transport it on a chute, along which the tire is conveyed by sliding to a post-inflation unit or to a continuous or intermittent conveyor.

The use of these appropriate devices not only involves a considerable expense, but also necessarily requires a free space in the central zone of the curing unit. This space, to the contrary, could be used advantageously for any other apparatus suitable to make more automatic the operation of the curing unit itself, or to confer a greater regularity and uniformity to the tire.

The object of the present invention is an automatic process for removing a cured tire from a mold, incorporated in a curing unit and provided with a section constituted by sectors corresponding to the tread band, and for discharging said tire from the curing unit, which does not require the use of any additional means with respect to those already used for the previous tire molding and curing operations.

The process according to the invention consists in disengaging at first the lower sidewall of the tire by raising the latter with respect to the position in which this has been cured, but by maintaining it engaged with the mold both at its tread band and at its upper sidewall; disengaging subsequently said tread band by displacing radially outwardly the sectors engaged with it; and pushing the tire towards an underlying inclined plane or any other means able to receive it and to convey it towards a post-inflation device or a conveyor of conventional type.

If the above indicated operations are not sufficient to disengage the tire completely also from the upper section of the mold, said process comprises the steps of pushing the tire, by means of at least a part of the upper section of the mold, to a level lower than that corresponding to the lower surface of the section of the mold constituted by sectors; displacing said sectors radially in the direction of the tire so that their inner diameter becomes smaller than the outer diameter of the tire; raising again the tire together with at least a part of the upper section of the mold, in which it is still engaged, and causing its disengagement from said section by going on raising the tire after it has come into contact with the lower surface of said sectors.

A further object of the present invention is constituted by employing an apparatus comprising means able to actuate the various parts of a mold, the mold comprising at least two sections corresponding to the tire sidewalls and an intermediate section, constituted by sectors, corresponding to the tread band of the tire, so that the parts of the mold may be enabled to carry out the above described process.

The apparatus comprises means able to raise simultaneously the upper section of the mold and the central section constituted by sectors with respect to the lower section, means able to maintain said sectors in their radially innermost position during their lifting, and means able to displace said sectors radially to different levels.

If said means are not sufficient to disengage the tire completely also from the upper section of the mold, the apparatus comprises further means able to displace vertically at least a part of the upper section of the mold, irrespectively of the sectors. In the particular embodiment illustrated by way of example in the present application, and described hereinafter, the apparatus is the same used for molding and curing the tire which is to be removed from the mold.

These and other features of the present invention will be more evident from the following description, made with reference to the attached drawings, in which:

FIGS. 2–7 represent the various steps of the method carried out with the apparatus of FIGS. 1 and 1a.

Figure 1:
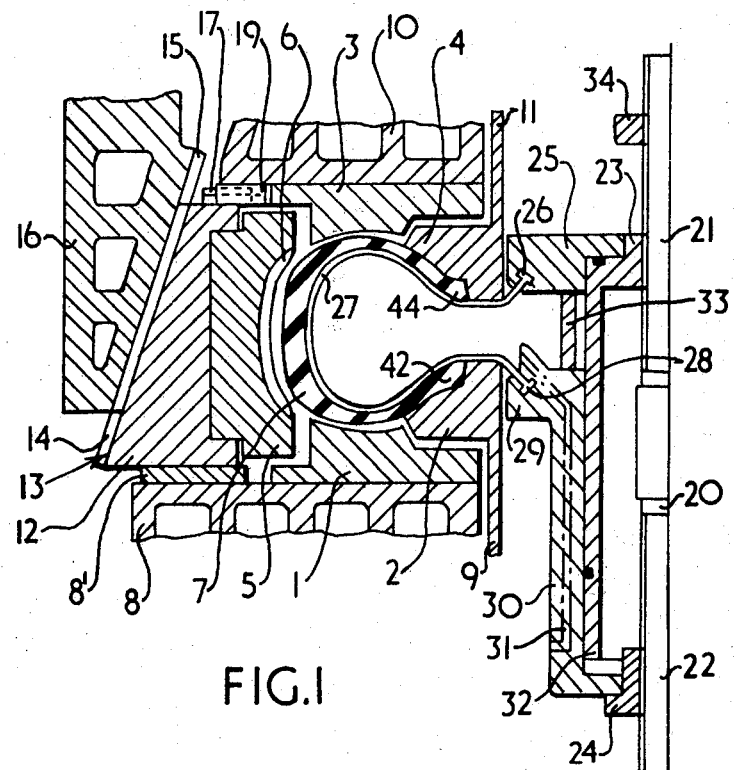
FIG. 1 represents partially in longitudinal section, an apparatus able to carry out the method forming the object of the present invention.
Figure 1A:
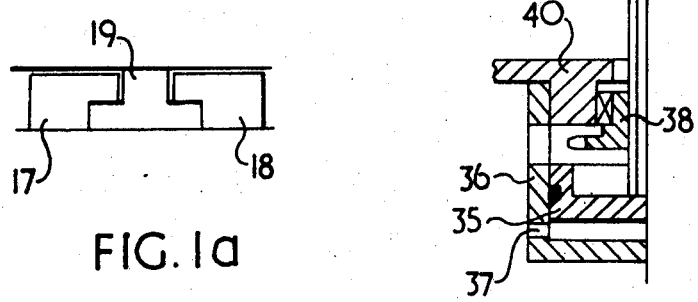
FIG. 1a is the cross-section of a detail of the apparatus of FIG. 1, in enlarged scale.

The apparatus represented in FIGS. 1 and 1a comprises a mold constituted by a lower section divided into two continuous annular elements 1 and 2, by an upper section divided into two continuous annular elements 3 and 4, and by an intermediate annular section divided into a plurality of sectors 5 provided on their inner surface with radial sculptures 6 corresponding to the grooves of the profile which is to be molded on the tread band 7 of the tire.

The annular element 1 is fastened to the underlying hot platen 8, mounted on the frame of the apparatus to heat the lower section of the mold, and provided on its upper surface with an annular plate 8'.

The annular element 2 of the section is assembled at the end of a rod 9, the other end of which is connected with a piston slidable into a single-acting cylinder (not shown) mounted on the frame of the machine (not shown).

The annular element 3 is fastened to the hot platen 10, secured to the ends of a plurality of rods (not shown); the other ends of said rods are fastened to corresponding pistons slidable into double-acting cylinders (not shown) mounted on an upper ledger (not shown) of the apparatus, which can be displaced vertically.

The hot platen 10 and the annular element 3 can be displaced vertically together with the ledger but also independently of it. The annular element 4 is mounted at one end of a rod 11, the other end of which is fastened to a piston slidable into a double-acting cylinder (not shown) mounted on the ledger.

The sector 5 is mounted on a support 12, provided on its face opposite to that supporting the corresponding sector with an inclined plane 13 limited by two lateral guides 14, in which is inserted an inclined plane 15 fastened to the hot platens 16 used for heating sectors 5.

The upper end of the hot platens 16 is fastened to the upper ledger. Each support 12 of sectors 5 is provided on its upper surface (see FIG. 1a) with two L-shaped elements 17 and 18, slidable along a central guide 19, secured to the lower surface of the hot platen 10.

The apparatus comprises moreover a screw 20, arranged along the axis of the mold and provided with two threads 21 and 22 of opposite sense, into which engage two nut screws 23 and 24. These are prevented from rotating about the axis of the screw 20 by means not represented in the Figure (as for instance a tang or a peg fastened to the nut screws and slidable in a recess of the frame of the apparatus parallel to the axis of screw 20).

The nut screw 23 carries, fixed to it, an annular element 25, in which is clamped the thickened edge 26 of an elastic membrane 27, the other thickened edge 28 of which is clamped in the flange 29 of a tubular body 30 inferiorly connected to the nut screw 24. The tubular body 30 is provided with ducts 31, which open inside the membrane 27, for the admission and the discharge of compressed fluid from the inside of the same. The nut screw 23 is fastened to a tubular element 32 tightly slidable along the tubular body 30 to prevent the outflow of the compressed fluid which is admitted into the membrane 27.

The upper face of flange 29 is provided with a spacing element 33, having the task of stopping the downward movement of the nut screw 23 at a distance from the nut screw 24 which corresponds to the operation of molding the profile in the tread band 7 of the tire. Thread 21 of screw 20 engages also with a nut 34, which has the task of stopping the upward movement of the nut screw 23. The lower end of screw 20 has a hexagonal cross-section and is rotatably mounted on a piston 35 slidable in a cylinder 36, provided with a lateral hole 37 for the admission and the discharge of compressed fluid below piston 35. On the hexagonal lower end of screw 20 there is inserted a gear 38, which can be placed into rotation in the bearing 39 by a motor, not shown in the Figure, through a conventional chain or gear driving system. Bearing 39 is mounted on an annular element 40 fixed on cylinder 36, so that screw 20 can be displaced vertically by means of piston 35, while gear 38 remains fixed in the same position.

The process for molding the profile in the tread band 7 of a tire 41 with an apparatus like that represented in FIGS. 1 and 1a has already been described in detail in my copending U.S. Pat. application Ser. No. 295,916 filed on Oct. 10, 1972, commonly assigned with the instant application and now abandoned. The present application will therefore contain only a brief summary of the process in question.

The process is started with the mold completely opened, with the pistons supporting the hot platen 10 in their lowest position, with the membrane 27 completely stretched in cylindrical form and at the level corresponding to the position of contact between the nut screw 23 and the stop 34, namely with piston 35 raised and with the annular element 2 of the lower section of the mold kept raised, with respect to the annular element 1 of the same section, by means of a fluid at a pressure which is greater than that of the fluid to be used inside the membrane 27 for the first molding phase of the profile on the tread band 7 (which is effected through a centripetal compression of the latter by sculptures 6 of sectors 5), but which is smaller than that of the fluid to be admitted inside the membrane 27 for the second molding phase of said tread band 7 (which is instead effected through an expansion of the top portion of the tire towards said radial sculptures 6).

The tire 41, previously shaped, is leant with its lower bead 42 on the annular element 2 by means of a conventional loader, which supports it at its upper bead 44, in such a way that the plane equidistant from the tire beads coincides with the median plane of membrane 27. Then the membrane 27 is inserted inside the tire, by admitting into it a fluid at a pressure smaller than that corresponding to the tire shaping pressure, and at the same time by effecting a symmetrical displacement of the edges 26 and 28 of membrane 27 towards the median plane of the latter until the annular element 25 comes into contact with the spacing element 33.

Then the upper ledger of the apparatus is lowered until the upper bead 44 is brought into contact with the annular element 4. This is kept spaced apart from the annular element 3 by the fluid, which is in contact with both faces of the piston fastened to rod 11.

In the upper part of the piston this fluid is at a pressure equal to that of the fluid which keeps the annular element 2 spaced apart from the annular element 1. Then the pressure inside membrane 27 is increased up to the value corresponding to that for shaping the tire, and the upper ledger is further lowered, reducing in this way the distance between the beads 42 and 44 of the tire, and bringing the lower surface of supports 12 into contact with plate 8'. At the same time screw 20 is lowered in order that membrane 27 be always symmetrical with respect to the plane equidistant from the tire beads. Then, by completing the lowering of the upper ledger of the apparatus, it is possible to initiate the upward displacement of the pistons connected to the rods which support the hot platen 10, the sliding of the inclined planes 15 of the hot platens 16 along the inclined planes 13 of the corresponding supports 12 of sectors 5, then the centripetal displacement of the sectors with consequent complete closure of the mold and partial molding of the profile in the tread band 7, due to the partial penetration of sculptures 6 in the band.

Figure 2:
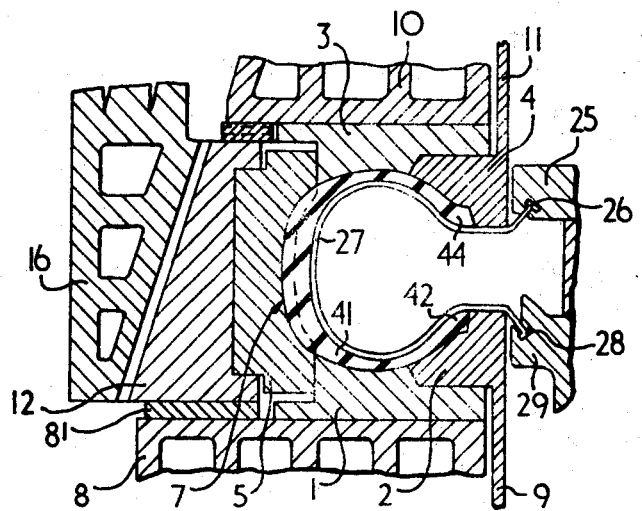

At last, by increasing progressively the pressure inside the tire until reaching the value corresponding to the curing pressure, the pressure of the fluid which maintains the annular elements 2 and 4 respectively detached from the annular elements 1 and 3 is overcome, so that annular elements 2 and 4 are consequently brought into contact with elements 1 and 3, terminating the free expansion of the sidewall zone comprised respectively between the annular elements 2 and 4 and the top portion of the tire, and the expansion of said top portion, with the consequent complete penetration of the same between sculptures 6 (see FIG. 2).

Then the tire is cured.

To remove the cured tire from the mold and to discharge it from the apparatus, the following operations are carried out.

The compressed fluid is discharged from the inside of membrane 27 through ducts 31 and then the membrane is removed from the inside of tire 41 by placing into rotation screw 20 by means of gear 38, so that edges 26 and 28 of membrane 27 are displaced symetrically in a direction opposite to the plane equidistant from the tire beads, and membrane 27 takes again its cylindrical shape.

Figure 3:
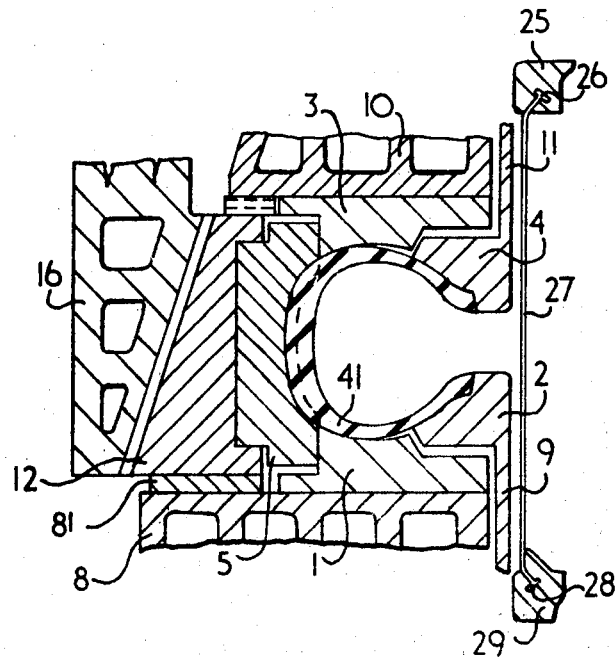
Figure 4:
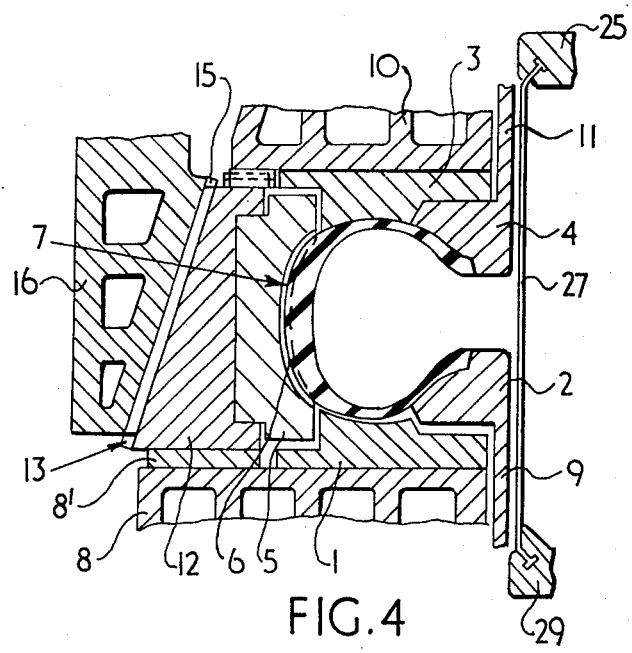

By reducing the pressure inside the tire, the annular elements 2 and 4 are no longer compelled to adhere to the corresponding annular elements 1 and 3, and therefore they detach again from the latter under the action of the fluid in contact with the pistons connected to rods 9 and 11 (see FIG. 3).

Now compressed fluid is admitted in contact with the upper face of the pistons connected to the upper hot platen 10 so that supports 12 of sectors 5 are kept well fixed against the annular plate 8', fastened to the hot platen 8. In the meantime the lifting of the upper ledger of the apparatus, and consequently of the lateral hot platens fastened to it, is started.

In this way, at the beginning of the lifting it is possible to initiate a limited sliding of the inclined planes 15 of the hot platens 16 along the inclined planes 13 of the corresponding supports 12 of sectors 5. Therefore a small radial displacement of the sectors in a direction opposite to that of the lower and upper sections of the mold is effected, so that the radially innermost vertical surfaces of sectors 5 are slightly detached from the annular elements 1 and 3, and the basis of sculptures 6 is slightly detached from the outer surface of the tread band 7. Moreover, the annular element 4 is also lifted together with the upper ledger (on which is mounted the double-acting cylinder into which is slidably mounted the piston fastened to rod 11) coming into contact with the annular element 3.

By continuing to lift the upper ledger of the apparatus, while the upper hot platen 10 is always kept pressed downward at a pressure smaller than the force applied in opposite direction on the ledger for its lifting and consequently also for the lifting of the annular element 4, it is possible to draw upward also the annular element 3, against which is engaged the annular element 4. Also the supports 12 and the sectors 5, which are maintained by element 4 in the same relative position, with respect to the element 3, which they had taken after the slight detachment from element 3, as well as the tire, the tread of which is still engaged between the sculptures 6 of sectors 5, are simultaneously lifted.

This lifting of the upper ledger is stopped when the tire has reached the level corresponding to that of the upper end of screw 20 (see FIG. 5), so that the tire is disengaged from membrane 27, which it was still surrounding.

The slight detachment of sectors 5 from the annular elements 1 and 3 of the lower and upper sections of the mold before raising sectors 5, is carried out to prevent a prejudicial rubbing from taking place between the contacting surfaces of sectors 5 and of the annular element 1, during said movement upward, since said sectors are initially firmly pushed against the annular element 1.

Figure 6:
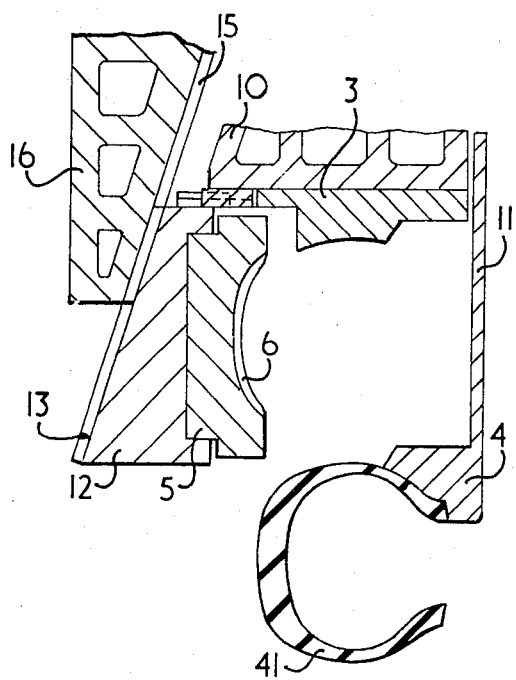
Figure 7:
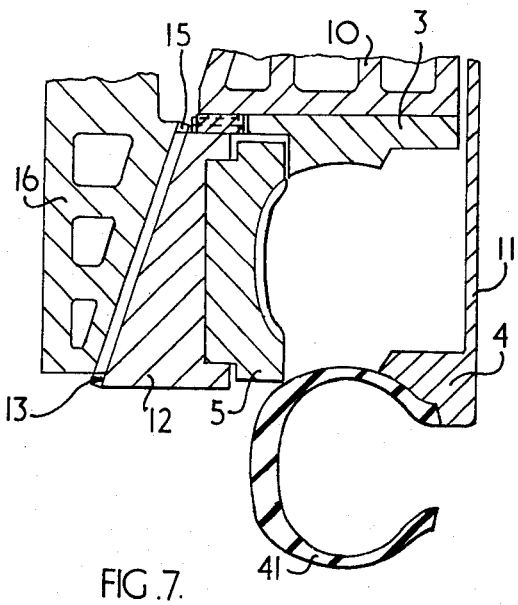

At this moment, the piston connected to the upper end of rod 11 is lowered, lowering consequently also annular element 4. The upper hot platen 10, which is always pushed downward by the pistons slidable in the cylinders mounted on the upper ledger, is now free to move downward with respect to the ledger and to initiate the sliding of the inclined planes 13 of supports 12 of sectors 5 along the inclined planes 15 fastened to the lateral hot platens 16. Consequently, sectors 5 are completely displaced in a radial direction, opposite to that of the tire axis. In this way the tire is completely disengaged from sculptures 6 and from the annular element 3 and is moved downward together with the annular element 4, with which it remains engaged (see FIG. 6).

Figure 5:
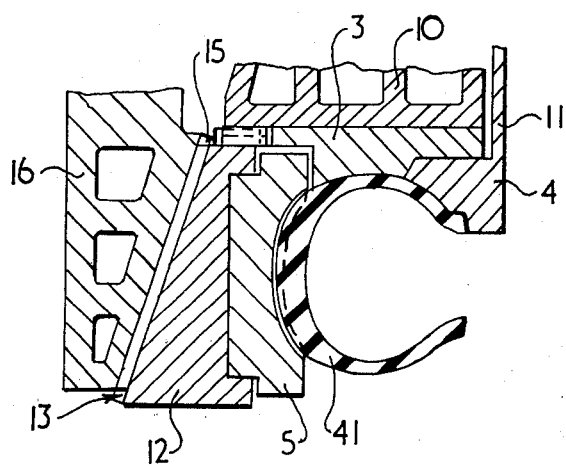

Sectors 5 are then brought again into the position of FIG. 5 by admitting compressed fluid below the pistons connected to the upper hot platen 10, so that the latter again approaches the upper ledger. In the meantime the inclined planes 13 of supports 12, sliding upwardly along the inclined planes 15, initiate a centripetal displacement of sectors 5 connected to them.

At this time compressed fluid is admitted below the piston fastened to rod 11, which raises again the annular element 4 and the tire engaged thereto. When the upper part of the tread comes into contact with the lower part of sectors 5, (which are in a position of closure) the tire 41 detaches from the annular element 4, it being prevented from following the upward movement of the latter. Tire 41 falls on an inclined plane inserted between the upper end of screw 20 and the lower surface of the tire, not indicated in the Figures.

According to an alternative embodiment, the upper ledger of the apparatus can be displaced laterally with respect to the axis of the lower section of the mold, after having caused, with its upward displacement, the tire to slip off from the membrane 27, stretched in cylindrical form, so that the tire falls on an inclined plane arranged at the side of the apparatus.

Of course, the above described process can be carried out by means of apparatuses which are modified with respect to that described above without falling outside of the scope of the present invention.

As it clearly appears from the foregoing description, the process for discharging the cured tire from the mold, which forms the object of the present invention, does not require the use of any additional device, but involves only the employment of the means indispensable for molding and curing the tire. Moreover, in the particular embodiment illustrated, it permits use of a device which allows the insertion of the curing bag in the tire to be treated in such a way that the edges of the membrane constituting said curing bag are always equidistant from the plane equidistant from the tire beads. In such a way the overall cost of the curing unit is conveniently reduced, while the quality of the produced tires has quite a high standard.

What is claimed is:

1. In a process for automatically discharging a cured tire from a mold comprising at least one upper section corresponding to the upper sidewall of said tire and comprising at least two parts, at least one of said parts being vertically movable with respect to the other part, one lower section corresponding to the lower sidewall of said tire and one intermediate section comprising a plurality of sectors radially displaceable in both directions and corresponding to the tread band of said tire, wherein the lower section of the cured tire is disengaged from the lower section of said mold by raising the upper and intermediate sections, with which the tire is still engaged, the tread band of the cured tire is disengaged from the intermediate section by radially outwardly displacing said sectors, the upper sidewall of the tire is disengaged from at least a part of the upper section of the mold by pushing the cured tire downward with respect to the latter and to said intermediate section by moving the other part of said upper section, still engaged to the corresponding part of the upper sidewall of said cured tire, the improvement which comprises pushing the cured tire downward to a level lower than that corresponding to the lower surface of the sectors of said intermediate section, displacing radially inwardly said sectors to impart an inner diameter smaller than the outer diameter of the tire to said intermediate section, and raising the cured tire again together with said engaged part of said upper section whereby said tire is also disengaged from the latter part when said tire comes into contact with the lower surface of the sectors and stops, while said part continues to rise towards the other part of the upper section of the mold.

2. The process of claim 1 wherein the zone of the upper sidewall of the tire engaged with said part of the upper section, vertically displaceable with respect to the other part of the upper section and the intermediate section, comprises the bead of said tire and the sidewall zone nearest the bead of said tire.

* * * * *